United States Patent [19]

Froning

[11] Patent Number: 5,111,039
[45] Date of Patent: May 5, 1992

[54] PHOTOELECTRIC VERTICAL SENSOR WITH PRESSURE COMPENSATION MEANS

[76] Inventor: Edilbert Froning, Bodanstr. 23, 7772 Oberuhldingen, Fed. Rep. of Germany

[21] Appl. No.: 580,211

[22] Filed: Sep. 10, 1990

[30] Foreign Application Priority Data

Sep. 11, 1989 [DE] Fed. Rep. of Germany ....... 3930228

[51] Int. Cl.⁵ .............................................. G01D 5/34
[52] U.S. Cl. .................................. 250/231.10; 33/366
[58] Field of Search ........................ 250/231.1, 231.11; 356/151; 33/366, 379, 380, DIG. 19

[56] References Cited

U.S. PATENT DOCUMENTS

| | | | |
|---|---|---|---|
| 3,281,947 | 11/1966 | McDowell | 33/379 |
| 3,813,556 | 5/1974 | Beer et al. | 250/231.1 |
| 4,154,000 | 5/1979 | Kramer | 33/366 |

Primary Examiner—David C. Nelms
Assistant Examiner—John R. Lee
Attorney, Agent, or Firm—Lee, Mann, Smith, McWilliams & Sweeney

[57] ABSTRACT

In a vertical sensor, a container encases a light absorbing liquid. An air bubble is formed within the light absorbing liquid and is displaced in the event that the container deviates from a vertical indicating position. A light source and a photoelectric detector are arranged on opposite sides of the container and form a light barrier which responds to migration of the air bubble as a result of a deviation of the container from the vertical indicating position. At least one shell portion of the container is of a flexible nature for pressure compensation.

5 Claims, 1 Drawing Sheet

PHOTOELECTRIC VERTICAL SENSOR WITH PRESSURE COMPENSATION MEANS

BACKGROUND OF THE INVENTION

The present invention relates to a new and improved construction of a vertical sensor.

In its more particular aspects, the present invention specifically relates to a new and improved construction of a vertical sensor containing a container filled by a light absorbing liquid and an air bubble enclosed therein. The air bubble is displaced upon deviation of the container position from its vertical indicating position. Light barrier means are disposed on opposite sides of the container and respond to the displacement of the air bubble.

North-seeking gyro devices as well as other apparatus require vertical disposition for their faultless function. It is known to effect vertical alignment of a device or apparatus by means of a mercury-filled container wherein electrical contact is made upon deviation of the container position from the vertical position. A finite separating distance must be present between the mercury surface and a contact which is not immersed into the mercury in the vertical container position. Mercury switches of this type thus respond only to coarse deviations from the vertical in the order of magnitude of some degrees. Such mercury switches, then, can supply a signal which either indicates the deviation from the vertical position or causes automatic re-alignment.

An apparatus of this type such as known, for example, from U.S. Pat. No. 4,154,000, granted May 15, 1979, and directed to remote sensing of horizontal alignment, contains a cylindrical container which is filled by a transparent liquid including an air bubble. A plural number of light sources and light sensors are arranged on respective opposite sides of the container in a manner such that the light emitted by the light sources, impinges upon the light sensors due to light refraction by the liquid-filled container, i.e. in the absence of the air bubble. The arrangement is such that there are indicated a zero position of the air bubble and its deviation from the zero position as well as the direction of the deviation in order to effect, for instance, horizontal positioning of a trailer or mobile home.

U.S. Pat. No. 4,110,609, granted Aug. 29, 1978, relates to a tilt limiting detecting apparatus containing, among other things, a vessel which is rectangular in section and filled by an opaque liquid including an air bubble. Light sources and light sensors are arranged on respective opposite sides close to the ends of the container. The light sensors produce an output signal in the presence of the air bubble which migrates towards corresponding ones of the container ends upon deflections of the container from its horizontal position.

U.S. Pat. No. 3,813,556, granted on May 28, 1974, is also concerned with tilt limit detecting apparatus in connection with, for example, aircraft landing systems. This apparatus contains, among other things, a curved container which is rectangular in cross-section and filled by an opaque liquid including an air bubble. In a zero position of the air bubble, a light source and a light sensor are disposed on respective opposite sides of the container. Additionally, and at a lateral spacing greater than the width of the air bubble, a further light source and a further light sensor can be provided for determining the direction of a deflection of the container from the horizontal position.

From U.S. Pat. No. 4,517,750, granted May 21, 1985, there are known a vertical indicating method and device, particularly in connection with a compound pendulum which contains a rotatably journalled rotor in a liquid-filled housing. The housing is provided with a bellows to compensate temperature-caused changes in the liquid volume. There is thus provided therein a container which is completely filled by the liquid, and liquid volume compensating means are arranged within the container in order to maintain substantially constant the pressure prevailing in the interior of the container in the event of temperature changes.

In the aforementioned vertical sensors the liquid including the air bubble is tightly enclosed into the container so that the air bubble is subject to changes in shape as a result of temperature changes as such but also due to the volume changes in the liquid connected therewith. Thus, in the event of a temperature increase, the volume of the air bubble may be reduced to an extent such that there is caused thereby, at the sensor of the light barrier means, an intensity change of the light impinging thereupon and, in turn, simulated a deviation of the container from its vertical indicating position.

SUMMARY OF THE INVENTION

Therefore, with the foregoing in mind, it is a primary object of the present invention to provide a new and improved construction of a vertical sensor which is not afflicted with the drawbacks and limitations of the prior art constructions heretofore discussed.

Another and more specific object of the invention is directed to providing a new and improved construction of a vertical sensor which is substantially insensitive to temperature effects.

Now in order to implement these and still further objects of the invention, which will become more readily apparent as the description proceeds, the vertical sensor of the present development is manifested by the features that, among other things, the container comprises two oppositely disposed, rigid transparent end plates and at least one flexible shell portion which serves as a pressure compensating means.

The vertical sensor according to the invention operates according to the principle of the bubble or water level device and, therefore, can be constructed to be highly sensitive. The sensitivity can be determined by the shape of the inner wall of the container. Preferably, the inner wall of the container is shaped at the top side in a manner such that the air bubble, in the vertical position, is just retained in a well-defined position but that a lateral migration of the air bubble is effected already at small deviations from this vertical position. The air bubble migration is photoelectrically detected by the light barrier means. The light barrier means respond to the intensity jump which occurs when the air bubble migrates out from the field of view defined by the light barrier means and only the light absorbing liquid is present instead of the air bubble between the transmitter and receiver of the light barrier means.

The at least one flexible shell portion of the container follows the volume changes of the liquid as a result of temperature changes. Consequently, such volume changes remain without effect upon the air bubble volume and thus upon the indication of the vertical position. This has particular significance in connection with the faultless function of north-seeking gyros.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
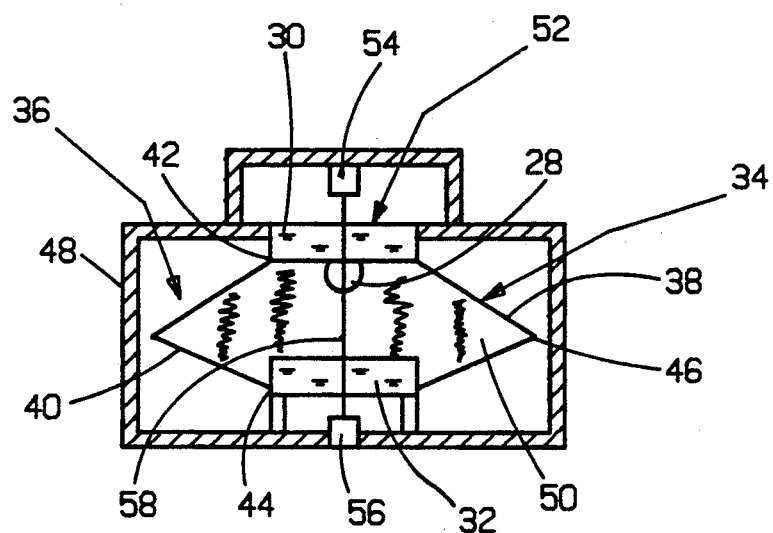
FIG. 1 is a cross-sectional illustration of a first exemplary embodiment of the inventive vertical sensor containing pressure compensating means.

Describing now the drawings, it is to be understood that only enough of the construction of the vertical sensor has been shown as needed for those skilled in the art to readily understand the underlying principles and concepts of the present development while simplifying the showing of the drawings. Turning attention now to FIG. 1, there has been schematically shown in cross-section as a matter of example and not limitation, a first exemplary embodiment of a vertical sensor in which one side of an air bubble 28 adjoins a rigid, transparent end plate 30 constituting one end face of a container 34. The oppositely disposed end face of the container 34 is formed by a likewise rigid, transparent end plate 32. The rigid, transparent end plates 30 and 32 may constitute, for example, glass plates. The two rigid end plates 30 and 32 are interconnected by means of flexible shell portions 36 which serve as pressure compensating means. In the exemplary embodiment illustrated in FIG. 1, the shell portions 36 are formed by annular membranes 38 and 40. The annular membrane 38 has an interior rim or rim portion 42 which is connected to an edge or edge portion of the end plate 30. The annular membrane 40 has an interior rim or rim portion 44 which is connected with an edge or edge portion of the end plate 32. The outer rims or rim portions of the annular membranes 38 and 40 are interconnected along a connecting seam 46. The annular membranes 38 and 40 constitute metal membranes.

The end plate 30 which forms a top end plate, is located within a sensor housing 48. The end plate 32 which forms a bottom end plate, is supported inside the sensor housing. The container 34 defines an internal space 50 which is filled by a light absorbing liquid with the exception of the space occupied by the air bubble 28.

Light barrier means 52 are located in the sensor housing 48 and associated with the end plates 30 and 32. The light barrier means 52 contain a light source in the form of a light emitting diode 54 and a light receiver constituting a photoelectric detector 56, and transmit a light beam 58 substantially centrally through the internal space or chamber 50.

The inner surface or wall of the end plate 30 may be shaped very slightly concave so that the air bubble 28 assumes the illustrated substantially central position in the sensor housing 48 in its vertical indicating position wherein the light beam 58 extends precisely along the vertical. When the vertical sensor or the sensor container 48 is tilted away from the illustrated vertical indicating position by a small angle, the air bubble migrates laterally away from its position in the vertical indicating position of the sensor container 48. The signal at the output of the photoelectric sensor or photodetector 56 is thereby abruptly reduced. The photodetector 56 is connected in circuit in a manner such that no output signal is produced by the vertical sensor in the illustrated position in which the light beam 58 passes through the air bubble 28 whereby the light beam 58 is less attenuated by the light absorbing liquid. Contrary thereto, an output signal is produced once the air bubble 28 migrates sideways and the light beam 58 is thereby subject to higher absorption by the light absorbing liquid.

Such higher absorption may also result when the pressure prevailing in the container 34 is increased due to a temperature rise whereby the air bubble 28 is compressed and reduced. For this reason, the container 34 of the presently described exemplary embodiment of the inventive vertical sensor, is provided with the flexible shell portions 36. As a result, the liquid pressure resulting from a temperature increase can be compensated for and remains essentially at atmospheric pressure.

Figure 2:
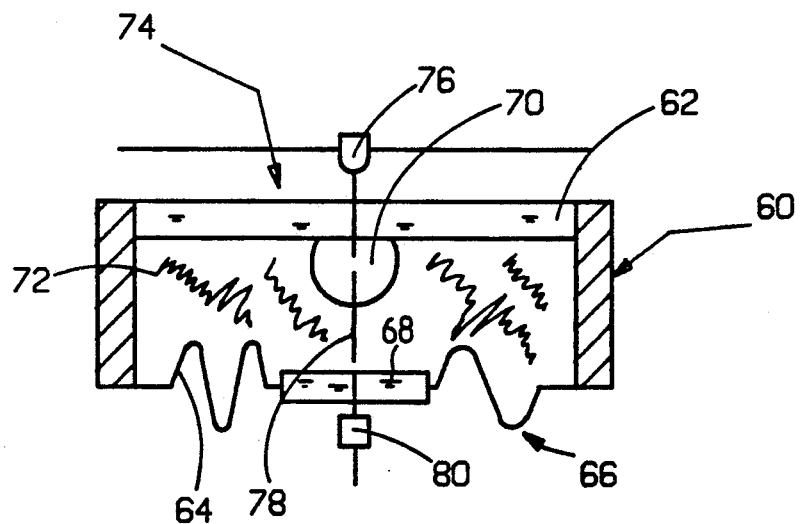
FIG. 2 is a cross-sectional illustration of a second exemplary embodiment of the inventive vertical sensor containing pressure compensating means.

In the exemplary embodiment illustrated in FIG. 2, the container 60 is substantially can-shaped and has one end face which is formed by a first rigid, transparent end plate 62, for instance, a glass plate. The oppositely disposed end face of the container 60 includes a flexible annular membrane 66 constructed as a metallic corrugated membrane containing concentric grooves 64. A second rigid, transparent plate 68 is substantially centrally held within this annular membrane 66. An air bubble is designated with the reference numeral 70 and is formed within a light absorbing liquid present within a chamber 72 of the container 60. The position of the air bubble 70 is monitored using light barrier means 74. The light barrier means 74 contain a light emitting diode 76 which emits a light beam 78 along an axis of the substantially can-shaped container 60 toward a photoelectric sensor or photodetector 80. In this construction, the annular membrane 66 acts as pressure compensating means. The vertical sensor illustrated in FIG. 2 operates substantially in the same manner as the vertical sensor as shown in FIG. 1.

The pressure compensating means also may be constructed as an elastic hollow body which is located within the container and which has an interior space connected to the atmosphere.

While there are shown and described present preferred embodiments of the invention, it is to be distinctly understood that the invention is not limited thereto, but may be otherwise variously embodied and practiced within the scope of the following claims.

Accordingly, what is claimed is:

1. A vertical sensor comprising:
   a container including two opposite sides; and at least one flexible shell portion
   said container being filled by a light absorbing liquid enclosing an air bubble;
   said container assuming a vertical indicating position in which said air bubble assumes a predetermined position within said container;
   said air bubble being subject to displacement from said predetermined position within said container upon deviation of said container from said vertical indicating position;
   two rigid transparent end plates each of which is located at a respective one of said two opposite sides of said container;

light barrier means associated with said two rigid transparent end plates and responsive to said displacement of said air bubble upon said deviation of said container from said vertical indicating position;

pressure compensating means compensating for pressure changes occurring inside said container relative to atmospheric pressure; and said pressure compensating means is provided by said at least one flexible shell portion of said container.

2. The vertical sensor as defined in claim 1, wherein:

said light barrier means contain a light source and a light receiver;

each one of said two rigid transparent plates defining an exterior side; and said light source and said light receiver being arranged at the exterior side of respective ones of said two rigid transparent plates.

3. The vertical sensor as defined in claim 1, wherein:

said at least one flexible shell portion constitutes two flexible shell portions;

said two flexible shell portions constituting two annular membranes having respective interior rim portions and exterior rim portions;

said two rigid transparent end plates defining respective edge portions;

said interior rim portions of said two annular membranes being affixed to said edge portions of respective ones of said rigid transparent end plates; and said two annular membranes being interconnected at said exterior rim portions.

4. The vertical sensor as defined in claim 3, wherein:

said annular membrances constitute metallic annular membranes.

5. The vertical sensor as defined in claim 1, wherein:

said two opposite sides of said container define two opposite end faces of said container;

a first one of said two opposite end faces of said container constituting a first one of said two rigid transparent end plates;

a second one of said two opposite end faces of said container comprising:

said at least one flexible shell portion;

said flexible shell portion constituting a metallic annular corrugated membrane containing concentric grooves;

said metallic annular corrugated membrane having an exterior rim portion affixed to said container; and a second one of said two rigid transparent plates being substantially centrally retained at said metallic annular corrugated membrane.

\* \* \* \* \*